United States Patent
Gabrys

(10) Patent No.: US 6,630,761 B1
(45) Date of Patent: Oct. 7, 2003

(54) COMBINATION MECHANICAL AND MAGNETIC SUPPORT FOR A FLYWHEEL POWER SUPPLY

(76) Inventor: Christopher W. Gabrys, 900 S. Meadows Pkwy., Apartment 3513, Reno, NV (US) 89511

( * ) Notice: Subject to any disclaimer, the term of this patent is extended or adjusted under 35 U.S.C. 154(b) by 11 days.

(21) Appl. No.: 09/927,307

(22) Filed: Aug. 10, 2001

Related U.S. Application Data

(60) Provisional application No. 60/224,465, filed on Aug. 10, 2000.

(51) Int. Cl.$^7$ .............................. H02K 7/09; H02K 7/08
(52) U.S. Cl. ......................................... 310/90.5; 310/90
(58) Field of Search ............................ 310/90.5, 90, 51

(56) References Cited

U.S. PATENT DOCUMENTS

| | | | | |
|---|---|---|---|---|
| 3,899,223 A | * | 8/1975 | Baermann | 310/90.5 |
| 4,223,240 A | | 9/1980 | Theyse | 310/74 |
| 5,346,362 A | | 9/1994 | Bonner et al. | 415/191 |
| 5,749,700 A | * | 5/1998 | Henry et al. | 415/104 |
| 5,905,321 A | | 5/1999 | Clifton et al. | 310/178 |
| 5,969,446 A | | 10/1999 | Eisenhaure et al. | 310/74 |
| 6,029,538 A | | 2/2000 | Little et al. | 74/572 |
| 6,160,331 A | * | 12/2000 | Morreale | 310/51 |

OTHER PUBLICATIONS

"Experimental Evaluation of a Metal Mesh Bearing Damper" Zarzour and Vance, ASME99–GT–15, 1999.
"Knitted Metal Technology, Knitted Wire Mesh Gaskets and Seals" http://www.jjadamo.com/knittedwire.html, Dec. 27, 2001.

* cited by examiner

Primary Examiner—Dang Dinh Le
(74) Attorney, Agent, or Firm—J. Michael Neary

(57) ABSTRACT

A combination mechanical and magnetic support system for a flywheel power supply for storing and retrieving energy in which said power supply includes a flywheel that spins about an axis of rotation inside an evacuated chamber, and an attached motor/generator for accelerating and decelerating the flywheel for storing and retrieving the energy. One or more rolling element bearings and at least one magnetic bearing are mounted in bearing housings attached to the chamber for providing radial and axial support for the flywheel in the chamber. A wire metal mesh spring damper between portions of the rolling element bearings and the bearing housings provide both radial damping and radial centering stiffness to the wheel. The support system has a radial stiffness that allows a cylindrical rigid body resonance of said flywheel to occur at a speed less 30% of the normal operating speed. The magnetic bearings support at least than 80% of the weight of the flywheel, thereby substantially extending the life the of the rolling element bearings.

12 Claims, 4 Drawing Sheets

COMBINATION MECHANICAL AND MAGNETIC SUPPORT FOR A FLYWHEEL POWER SUPPLY

This is related to U.S. Provisional Application No. 60/224,465 filed on Aug. 10, 2000 and entitled "High Speed Flywheel Bearing Damper".

This invention pertains to an improved bearing support for a flywheel power supply and more particularly an improved combination mechanical and magnetic bearing support system for a high-speed flywheel system that has significantly increased operating life capability, operates reliably and cleanly in vacuum, provides improved shock damage resistance, allows desirable low frequency rigid body resonances for transition to supercritical operation at reduced speeds, and is low in cost. Two general configurations of the invention exist; in one configuration the mechanical bearings are employed at all times but with very low loading due to off loading from the magnetic bearings, and in the other configuration the mechanical bearings are only employed intermittently because the magnetic bearings have full 5 axes stability.

BACKGROUND OF THE INVENTION

Flywheel power supplies have emerged as an alternative to electrochemical batteries for storing energy with many advantages including higher reliability, longer life, lower or no maintenance, higher power capability and environmental friendliness. Flywheel power supplies store energy in a rotating flywheel that is supported by a low friction bearing system inside a chamber. The chamber is usually evacuated to reduce losses from aerodynamic drag. The flywheel is accelerated for storing energy and decelerated for retrieving energy through use of a motor/generator attached to the flywheel. Power electronics maintain the flow of energy in and out of the system and can instantaneously prevent power interruptions or alternatively manage peak loads.

To date, many types of support systems for flywheels have been developed. Some use mechanical bearings while others use magnetic bearings and yet others use a combination of the two types. Mechanical bearings are low in cost, however they suffer from fatigue and wear of the rolling elements and associated components. Magnetic bearings are usually more expensive and sometimes difficulties can arise in providing full five axes stable levitation in all operating conditions. To prevent damage to the power supply, mechanical auxiliary bearings are usually also provided in case the magnetic bearings fail to operate.

Because flywheel power supplies usually operate at very high speeds and are intended to last for ten to twenty years or more, careful design of the flywheel support is very important. Prior art has shown flywheel systems that can achieve long life with mechanical bearings by using mechanical bearings in combination with magnetic bearings. Ball bearings are used to provide radial support and the magnetic bearings greatly extend the ball bearing lives by providing some axial support, reducing the total load that they must carry. This support appears effective for smooth operation in low speed systems and where care can be taken to prevent damage to the bearings from shock loading during shipping and handling. However, to efficiently store large amounts of energy, it is desirable to further reduce radial loading, operating supercritically above the rigid body resonance. It is preferable to pass through the rigid body resonance at a relatively low speed such that the stored energy is low. The support must therefore be flexible. A flexible support also increases the durability and prevents damage to rolling element bearings from shock loading. Unfortunately, to achieve this increased energy storage, mechanical bearing life and robustness, the flexible support that must be employed becomes the life-limiting factor, and also can generate other problems including inadequate heat dissipation, plastic yielding, outgassing in the vacuum and deterioration. A flywheel that operates at 30,000 rpm for 20 years will experience an extremely large number of cycles, in excess of 300 billion cycles.

Full levitation magnetic bearing systems provide radial support flexibility and can in addition allow the flywheel to spin about its mass center at a relatively low speed. However, they also require an auxiliary mechanical support system to prevent total system destruction in the event of excessive loading and displacement. Such a mechanical support system must survive high shock loading, high frequency and vacuum operation, and must not deteriorate after years of residency in vacuum. The mechanical auxiliary support should also preferably survive one or more complete spin downs of the flywheel in the event that the magnetic bearings completely fail. Such spin downs can take hours depending on the energy storage of the flywheel.

SUMMARY OF THE INVENTION

This invention is an improved combination mechanical and magnetic support for a high-speed flywheel used in a flywheel power supply. Mechanical bearings provide radial support and partial axial support for the flywheel while one or more magnetic bearings significantly increase the life of the mechanical bearings by carrying at least 80% of the flywheel's weight. Unlike prior art combination rolling element and magnetic support systems, the mechanical bearings are flexibly mounted. The radially flexible support provides the benefits of smooth transition to supercritical operation at low speed (preferably less than 30% of normal operating speed), lower radial bearing loading, and significantly improved shock damage prevention during operation and in shipping and handling. The flexible mount has a spring damper element constructed from metal mesh to enable it to match the increased life of the mechanical bearings. The metal mesh spring damper is uniquely capable of surviving the extreme cycles encountered, high frequency vibration and vacuum operation and long term residency. The mesh spring damper enables the long life of the high-speed combination bearing system by having both drastically improved life and properties over prior elastomeric and spring type flexible bearing supports.

A second configuration of the invention with the same benefits can also be employed with a full five axes stable magnetic bearing. In this case, the mechanical bearings are only in contact with the flywheel during excessive loading and displacements of the magnetic bearings. The mechanical bearings prevent damage during shipping and handling and during high-speed touchdowns. The use of a metal mesh spring damper again survives years of residency in vacuum without generating contamination and is capable of the impact and high frequency acceleration of a touchdown event. If the magnetic bearings fail completely, the mechanical support is capable of safely and reliably supporting the flywheel for spin down. As with the first configuration, the rigid body critical resonance is preferably pushed down below 30% of full speed such that transition occurs after 90% of the flywheels energy has already been removed. In both configurations of the invention, the support improves the durability, reliability and life of a flywheel power supply with a relatively low cost.

DESCRIPTION OF THE PREFERRED EMBODIMENT

Figure 1:
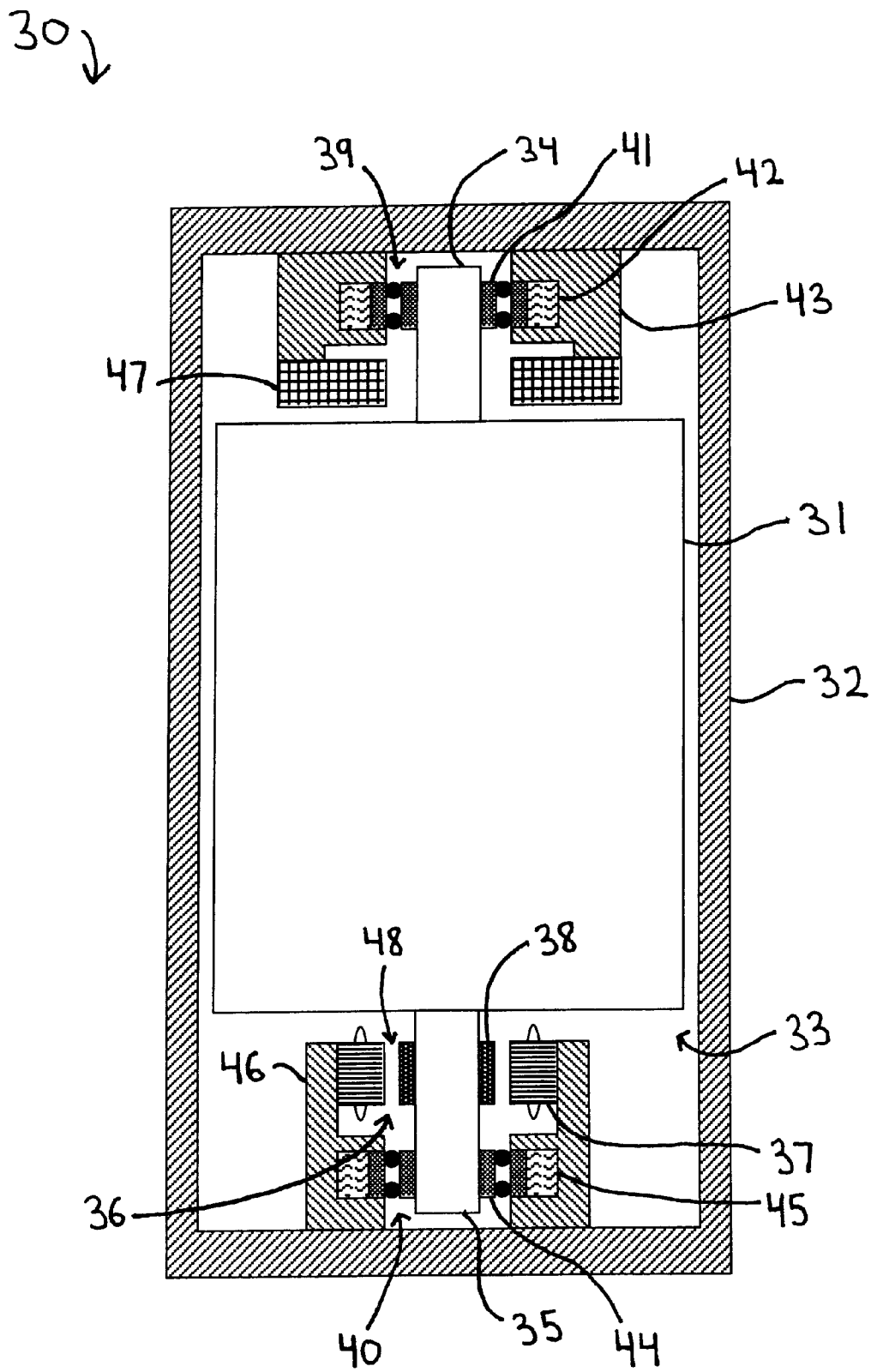
FIG. 1 is a schematic elevation of a flywheel power supply with combination mechanical and magnetic support in accordance with the invention.

Turning to the drawings, wherein like reference characters designate identical or corresponding parts, FIG. 1 shows a flywheel power supply 30 with combination mechanical and magnetic support in accordance with the invention. The flywheel power supply 30 uses a high-speed flywheel 31 for storing energy. The flywheel can be constructed of composite materials or from metal such as steel. Many designs of energy storage flywheels are well known in the art and could be employed with the invention.

The flywheel 31 is housed in a chamber 32 having an internal space 33 that is evacuated to low pressure for reduction of aerodynamic drag. The flywheel is accelerated and decelerated for storing and retrieving energy through the use of a motor/generator 36. Motor/generators employed with flywheel systems can include brushless permanent magnet designs as well as brushless reluctance designs. Reluctance designs with external field coils allow simpler output voltage control electronics, however they are less efficient than designs using permanent magnets for field generation. As illustrated, a permanent magnet motor/generator 36 is shown using a conventional radial airgap 48. Permanent magnets 38 are attached to the flywheel shaft 35, preferably through use of a thin high strength non-magnetic reinforcement sleeve, not shown. The magnets 38 are acted upon by the surrounding laminated stator 37. Use of an integrated flywheel with motor/generator or a separate motor and generator could also be employed.

To support the flywheel for rotation, the flywheel 31 has upper and lower shafts 34 and 35 that are radially supported by upper and lower bearings 39 and 40 in upper and lower bearing housings 43 and 46 fixed to the chamber 32. The bearings 39, 40 preferably use long life rolling element bearings 41 and 44 that are appropriately sized to handle the normal operating speed and also survive the life of the flywheel power supply 30. Larger bearings have reduced allowable operating speeds but can handle more cycles for a given load. Therefore, it is preferable to use the largest bearing size that is rated for the flywheel operating speed in order to insure the longest life. Ceramic hybrid ball bearing sets are useful for increasing the bearing life and allowable operating speeds over conventional steel ball bearings. Much of benefits of ceramic hybrid bearing sets are the result of the lower density of the ceramic balls. Such bearings are readily available from manufacturers such as Barden Bearings. The bearings 41, 44 are preferably lubricated using dry lubricants that do not appreciably contaminate the vacuum in the interior 33 of the chamber 32. Lubricant such as molybdenum disulfide can be applied to the bearings prior to installation or alternatively, the bearing cages, not shown, inside bearings 41, 44 can be coated or made from the lubricant and release the lubricant to the bearings over the operating life of the system.

The life of the mechanical bearings is directly related to the load that they carry. Bearing fatigue is generally regarded a cubic function of this load. Therefore, a reduction of the load carried by a factor of two will result in an increase in life by a factor of about eight. In accordance with the invention, the life of the mechanical bearings 41, 44 is increased by the use of a magnetic bearing 47 that carries a substantial portion of the flywheel weight. The magnetic bearing 47 can be actively controlled such as with use of an electromagnet or simply a passive bearing from permanent magnets. The magnetic bearing 47 preferably carries at least 80% of the flywheel's weight such that the mechanical bearings 41, 44 can survive the life of the flywheel power supply 30. If the magnetic bearing 47 carries 100% of the flywheel weight, the upper and lower bearings 41, 44 should be preloaded tandem pair angular contact bearing sets. This guarantees that the bearings will always carry some loading, which is necessary for rolling element bearings to prevent skidding and achieve maximum life. A life of ten to twenty years or more is deemed possible for flywheel systems.

For high-speed flywheel systems capable of storing large amounts of energy, it desirable to operate the flywheel system supercritically, that is above the rigid body resonance. Above the resonance, the flywheel is capable of spinning smoothly about its mass center, which will always differ some amount from the geometric center. With larger or higher speed flywheels, the stiffness imparted from mechanical bearings is many times inadequate to keep the flywheel operation smoothly subcritical throughout the entire operating speed range. Unfortunately, the mechanical bearing stiffness is high enough that the cylindrical and or conical rigid body critical is encountered at a speed high enough that the flywheel is storing a large quantity of energy.

To reduce the speed of transition through the rigid body critical modes, the radial support is made much more flexible by using a spring dampers 42, 45 to provide both radial damping and a centering stiffness. The spring dampers 42, 45 are constructed using metal wire mesh. Such wire metal mesh material can be purchased from Metex Corporation and the wire can be made from a choice of stainless steel, copper or other metals. Wire metal mesh dampers are an improvement over current squeeze film dampers which lose damping with increasing temperature. Wire metal mesh provides both radial centering stiffness and radial damping in the invention. It is uniquely applicable for use in the flywheel support system because of its expected almost indefinite cycle life that matches the continuous high-speed flywheel operation. The number of cycles for many flywheel systems is expected to exceed several hundred billion. Such life is not needed for other typical bearing applications. The high cycle life of the metal mesh spring damper is the result of using an either a preferably knitted or woven construction from small metal wires. The structure is then compressed in a die to reduce the percentage of open space in the mesh; Open space or density of the mesh usually ranges from 50% and higher. The small wire diameter, below 0.100 inches and more preferably below 0.025 inches, limits bending stresses from displacement and increases the life. Because of the much lower stresses, the mesh damper is believed to be capable of meeting the extraordinary life cycle of supercritically operated flywheel power supplies. The wire construction gives much higher shock loading capability, retaining resiliency, and expectedly much longer life than competing machined leaf or curved spoke type mechanical spring dampers. The mesh is preferably designed to handle radial loads of up to 10,000 lbs without plastic deformation so that the dampers can match the capacity of most likely bearings. The flexible support provided to the mechanical bearings can prevent damage to the flywheel and shaft during transportation, handling and from any shock loading during operation. Besides having the life capability for use in a supercritical mechanically supported flywheel system, the mesh also does not suffer from deterioration from high frequency operation or from years of residency in vacuum, and does not outgass as do elastomeric type spring dampers. The wire metal mesh spring dampers are also relatively low in cost.

Figure 2:
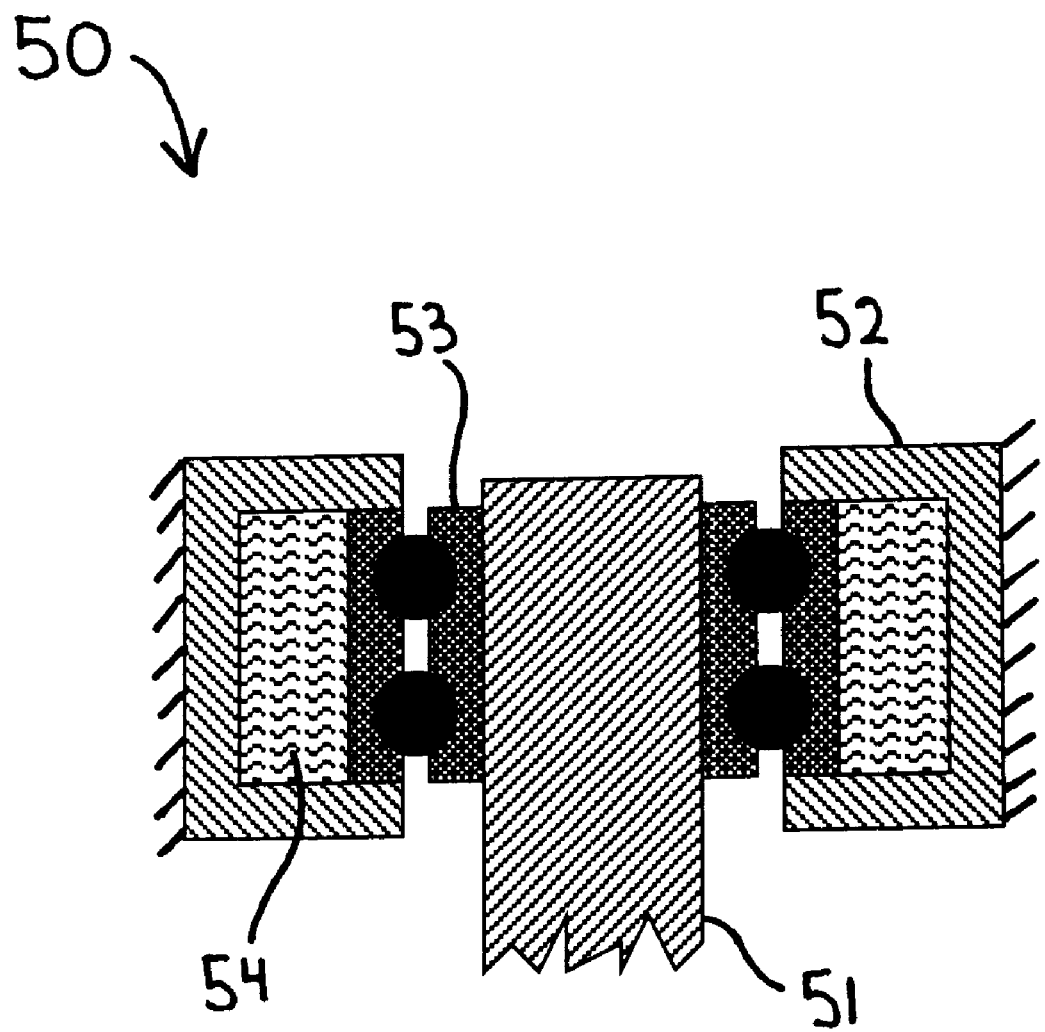
FIG. 2 is a schematic elevation of the rolling element bearing-spring-damper portion of a flywheel combination mechanical and magnetic support in accordance with the invention.

The mechanical bearing portion 50 of the combination mechanical and magnetic support is shown in FIG. 2. The flywheel shaft 51 is supported radially by a mechanical ball bearing set 53. The bearing set 53 is mounted inside a housing 52 that allows radial displacement. A metal wire mesh damper 54 is placed inside the housing 52 around the bearing 53 and it provides radial centering stiffness and damping to the flywheel shaft 51.

Figure 3:
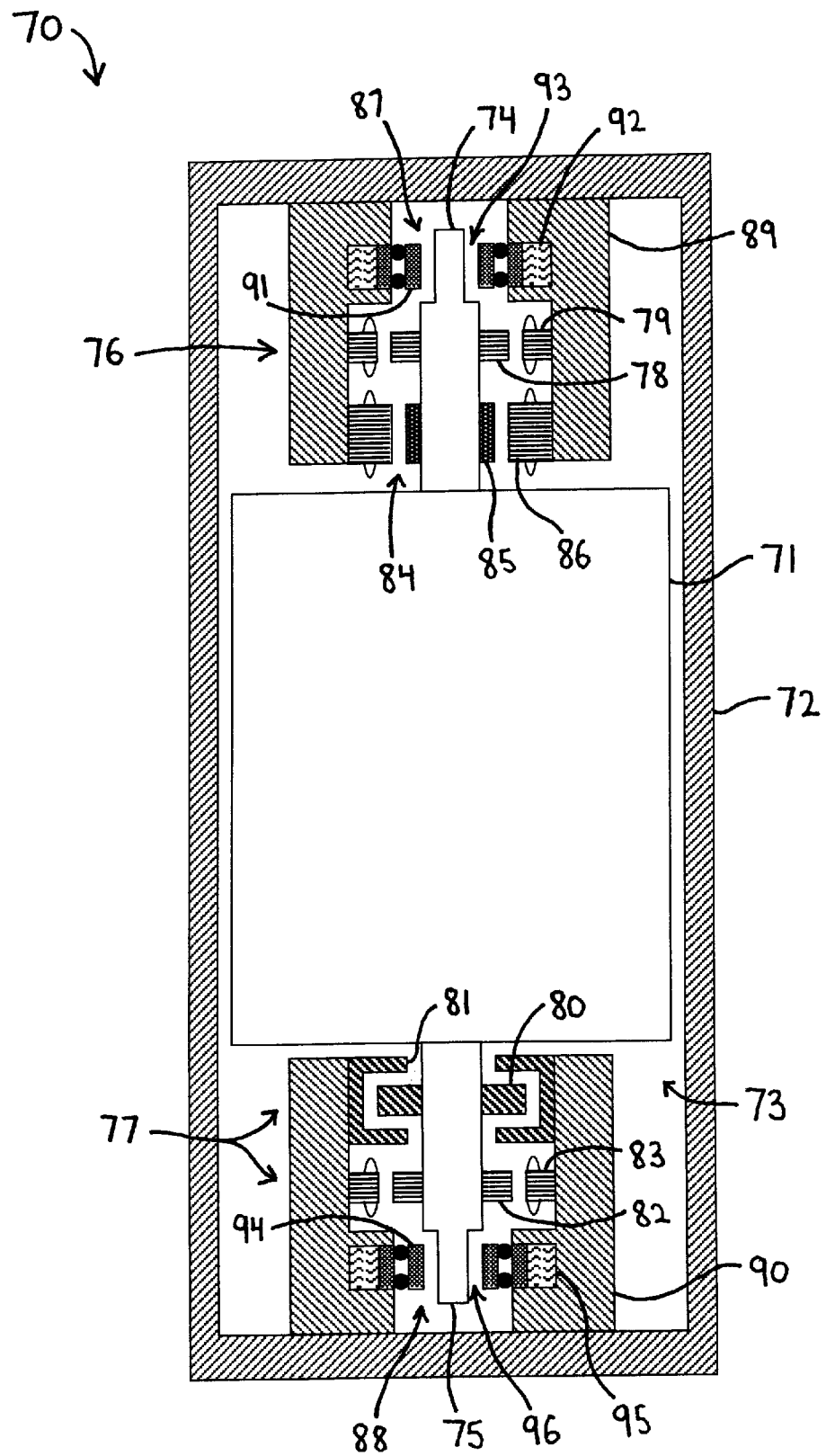
FIG. 3 is a schematic elevation of an alternative configuration of flywheel power supply with combination mechanical and magnetic support in accordance with the invention.

An alternate configuration of flywheel power supply with combination mechanical and magnetic support in accordance with the invention is shown in FIG. 3. The flywheel power supply 70 uses a flywheel 71 for storage of energy inside a chamber 72 that contains a vacuum 73. The flywheel has shafts 74 and 75 for journaling the flywheel 71 between the bearings 87 and 88. A motor/generator 84 is used for accelerating and decelerating the flywheel 71 for storing and retrieving energy. The motor/generator shown uses permanent magnets 85 attached to the flywheel shaft 74 that are acted upon by a surrounding laminated stator 86.

In this alternate configuration of the invention, the magnetic bearings 76 and 77 provide axial and also radial support for the flywheel. The magnetic bearings are a full five axes stable type such that there is no mechanical contact with the flywheel 71 under normal operation. Many designs of five axes stable magnetic bearing systems exist and could be employed with the invention. Some of them use passive radial bearings from permanent magnets while others have active radial electromagnetic control. As shown, the magnetic bearings 76, 77 are five active axes type. Radial laminated magnetic bearing rotors 78 and 82 are attached to each shaft 74, 75. The rotors are stably radially controlled through use of surrounding active radial bearing stators 79 and 83. The flywheel 71 is axially supported through use of an active axial magnetic bearing rotor 80 attached to shaft 75. The axial magnetic bearing rotor position is axially controlled through use of the axial bearing stator 81.

In the event that the load capability of the magnetic bearings 76, 77 is exceeded or if the magnetic bearings fail, total system destruction is prevented by the use of the auxiliary mechanical bearings 87 and 88. The auxiliary mechanical bearings 87, 88 are constructed similarly as the mechanical bearings of the first configuration except radial airgaps 93, 96 are provided. The mechanical bearings 87, 88 use rolling element bearings 91 and 94, preferably preloaded tandem pair angular contact bearing sets for reliable bearing loading when in operation. The bearings 91, 94 are supported using metal wire mesh spring dampers 92 and 95 inside the housings 89 and 90. As with the previous configuration, magnetic bearings greatly extend the life of the mechanical bearings by removing load. The flywheel can smoothly operate about rigid body resonances and the transition can occur at low speeds whether when spinning supported completely by the magnetic bearings 76, 77 or by the mechanical bearings 87, 88.

The spring dampers are capable of handling full speed spin downs on the mechanical bearings due to their high frequency and high cycle capability as well as good thermal conductivity for removal of bearing heat. The high shock loading capability of the dampers prevents damage to the bearings 91, 94 during shipping, handling or high speed and acceleration touchdowns. The spring dampers remain resilient and maintain the airgaps 93, 96 after a touchdown event. They also do not contaminate the vacuum and survive the years of residency in the vacuum without contaminating it.

Figure 4:
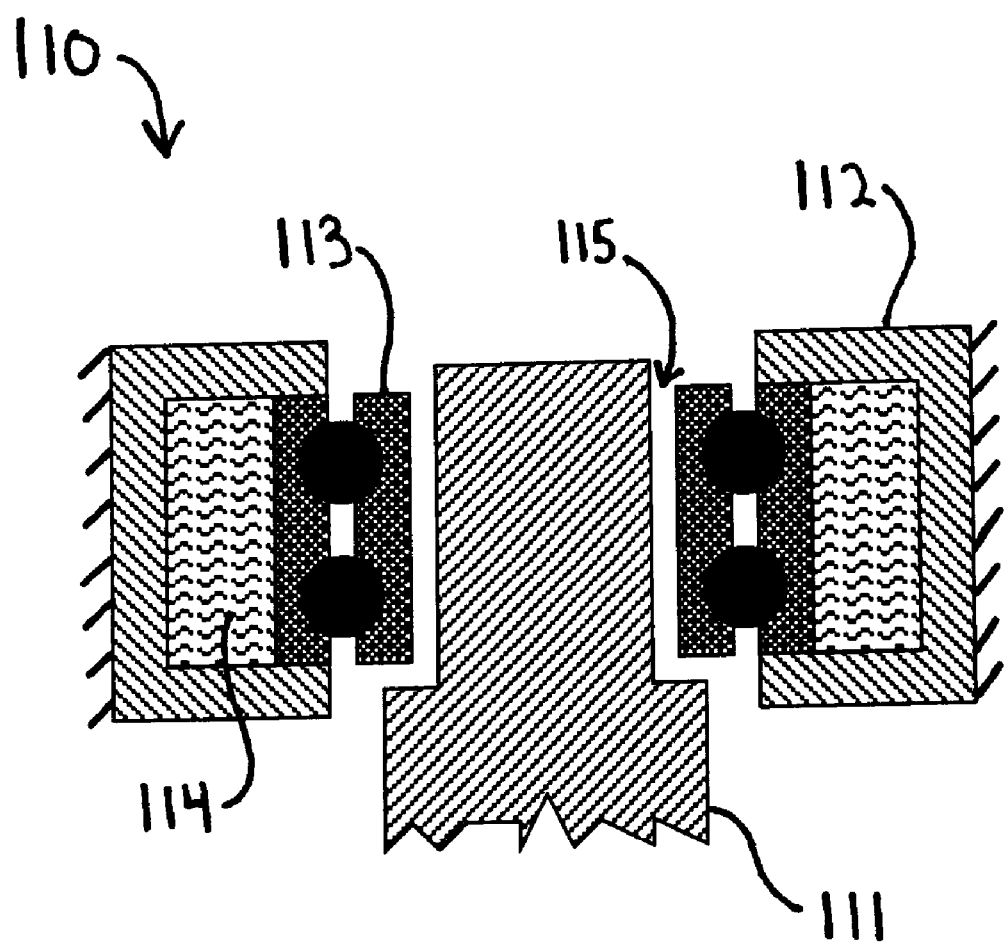
FIG. 4 is a schematic elevation of the alternate configuration of rolling element bearing-spring-damper portion of a flywheel combination mechanical and magnetic support in accordance with the invention.

The mechanical bearing portion 110 of the combination mechanical and magnetic support is shown in FIG. 4. The flywheel shaft 111 is supported radially by a mechanical ball bearing set 113 when the magnetic bearings, not shown, have exceeded their load capacity or are not functioning. A radial airgap 115 prevents contact during normal operation. The bearing set 113 is mounted inside a housing 112 that allows radial displacement. A metal wire mesh damper 114 is placed inside the housing 112 around the bearing 113 and it provides radial centering stiffness and damping to the flywheel shaft 111 when contacted. Other designs for placement of the mesh and surrounding structure could also be conceived.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein

I claim:

1. A combination mechanical and magnetic support system for a flywheel power supply for storing and retrieving energy in which said power supply includes a flywheel that spins about an axis of rotation inside an evacuated chamber, an attached motor/generator means is provided for accelerating and decelerating said flywheel, said combination mechanical and magnetic support for said flywheel comprising:

at least one rolling element bearing and at least one magnetic bearing in bearing housings mounted in said chamber providing radial and axial support for said flywheel in said chamber;

wire metal mesh spring dampers between portions of said rolling element bearings and said bearing housings, said spring dampers imparting both radial damping and radial centering stiffness to said flywheel;

said support system having a radial stiffness that allows a cylindrical rigid body resonance of said flywheel to occur at a speed less 30% of the normal operating speed;

said magnetic bearings supporting at least than 80% of the weight of said flywheel and thereby substantially extending the life the of said rolling element bearings.

2. A combination mechanical and magnetic support system as described in claim 1 wherein:

said rolling element bearing is continuously in contact with said flywheel.

3. A combination mechanical and magnetic support system as defined in claim 2 wherein:

said magnetic bearing uses rare earth magnets to provide lifting force.

4. A combination mechanical and magnetic support system as described in claim 1 wherein:

said rolling element bearings function as auxiliary bearings that contact said flywheel only when the radial displacement of said flywheel is excessive.

5. A combination mechanical and magnetic support system as described in claim 4 wherein:

said magnetic bearing is actively controlled in five active axes.

6. A combination mechanical and magnetic support system as described in claim 1 wherein:

said wire metal mesh is constructed from wires with diameter less than 0.100 inches.

7. A wire metal mesh as described in claim 6 wherein:
said wires of the mesh are knitted to form said mesh.

8. A wire metal mesh as described in claim 6 wherein:
said wires of the mesh are woven to form said mesh.

9. A combination mechanical and magnetic support system as described in claim 1 wherein:

said spring damper can withstand radial loading over 10,000 lbs without plastic deformation.

10. A combination mechanical and magnetic support system as described in claim 1 wherein:

said rolling element bearings are lubricated using a dry lubricant.

11. A combination mechanical and magnetic support system as described in claim 1 wherein:

said rolling element bearings include preloaded tandem pair angular contact ball bearing sets.

12. A combination mechanical and magnetic support system as described in claim 11 wherein:

said bearing sets use ceramic balls with metal races.

* * * * *